US010270806B2

(12) United States Patent
Akcin

(10) Patent No.: US 10,270,806 B2
(45) Date of Patent: Apr. 23, 2019

(54) DEFENSE AGAINST NXDOMAIN HIJACKING IN DOMAIN NAME SYSTEMS

(71) Applicant: Microsoft Technology Licensing, LLC, Redmond, WA (US)

(72) Inventor: Mehmet Akcin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 14/969,955

(22) Filed: Dec. 15, 2015

(65) Prior Publication Data

US 2017/0171242 A1 Jun. 15, 2017

(51) Int. Cl.
*H04L 29/06* (2006.01)
*H04L 29/12* (2006.01)
*G06F 21/00* (2013.01)
*G06F 17/30* (2006.01)

(52) U.S. Cl.
CPC .... *H04L 63/1466* (2013.01); *G06F 17/30887* (2013.01); *G06F 21/00* (2013.01); *H04L 61/1511* (2013.01); *H04L 61/6009* (2013.01)

(58) Field of Classification Search
CPC ............ H04L 63/1466; H04L 61/1511; G06F 3/04847; G06F 17/30864; G06F 17/30979
See application file for complete search history.

(56) References Cited

U.S. PATENT DOCUMENTS

| | | | | |
|---|---|---|---|---|
| 7,197,574 B1* | 3/2007 | Ishiyama | ......... | H04L 29/12066 709/223 |
| 2006/0253609 A1* | 11/2006 | Andreev | ......... | H04L 29/12132 709/245 |
| 2006/0253612 A1* | 11/2006 | Cheshire | ............... | H04L 61/103 709/245 |
| 2008/0028463 A1* | 1/2008 | Dagon | ............. | H04L 29/12066 726/22 |
| 2008/0114897 A1* | 5/2008 | Awadallah | ........ | H04L 29/12066 709/245 |
| 2009/0327487 A1* | 12/2009 | Olson | ............... | H04L 29/12066 709/224 |

(Continued)

OTHER PUBLICATIONS

Amit Agarwal, "Stop OpenDNS From Redirecting Invalid URLs to their Search Pages", https://www.labnol.org/internet/stop-opendns-from-redirecting-domain-typos/4112/, Aug. 2008, 5 pages.*

(Continued)

*Primary Examiner* — Eleni A Shiferaw
*Assistant Examiner* — Sher A Khan
(74) *Attorney, Agent, or Firm* — Liang IP, PLLC

(57) ABSTRACT

Various techniques for providing defense against NXDOMAIN hijacking in domain name systems are disclosed herein. In one embodiment, a method includes receiving a user input from a user to a search box in an application executing on a computing device connected to the Internet via a facility provided by an internal service provider ("ISP") and resolving the received user input to the search box as a DNS query without using a caching server provided by the ISP. The method can then include determining whether the DNS query causes an NXDOMAIN condition and in response to determining that the DNS query causes an NXDOMAIN condition, indicating that the received user input does not have a corresponding IP address in the domain name system.

19 Claims, 10 Drawing Sheets

(56) References Cited

U.S. PATENT DOCUMENTS

| | | | | |
|---|---|---|---|---|
| 2010/0046729 A1* | 2/2010 | Bifano | .............. | H04M 3/42178 379/201.12 |
| 2010/0106833 A1* | 4/2010 | Banerjee | ........... | H04L 29/12066 709/226 |
| 2010/0106854 A1* | 4/2010 | Kim | .................. | H04L 29/12066 709/238 |
| 2010/0121981 A1* | 5/2010 | Drako | .................... | G06F 15/173 709/245 |
| 2013/0054802 A1* | 2/2013 | Donzis | .............. | G06F 17/30887 709/225 |
| 2013/0198269 A1* | 8/2013 | Fleischman | .............. | H04L 61/20 709/203 |
| 2013/0291101 A1* | 10/2013 | Karasaridis | ............. | G06F 21/00 726/22 |
| 2015/0256424 A1* | 9/2015 | Kaliski, Jr. | ........ | G06F 17/30979 709/224 |
| 2015/0312272 A1* | 10/2015 | Dobbins | ............. | H04L 63/1458 726/12 |

OTHER PUBLICATIONS

TechNet (Microsoft),https://technet.microsoft.com/en-us/library/cc959309.aspx, Apr. 20, 2012, p. 1 (Year: 2012).*

* cited by examiner

DEFENSE AGAINST NXDOMAIN HIJACKING IN DOMAIN NAME SYSTEMS

BACKGROUND

In a computer network such as the Internet, users can identify web servers, email servers, or other resources by alphanumerical domain names. However, routers, switches, and other network services or devices identify such resources by numerical IP addresses. Domain name systems facilitate operations of computer networks by providing a translation service between alphanumeric domain names and numerical IP addresses. For example, a domain nameserver can translate a domain name "www.example.com" to an IP address "192.168.0.1." Routers, switches, or other computer services or devices can then access resources associated with this domain name based on the translated IP address.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In domain name systems, a domain nameserver may be unable to resolve or translate a particular domain name (e.g., "example.nxdom") because the domain name is misspelled, expired, or otherwise does not have a corresponding IP address. Such a condition can be referred to as NXDOMAIN. When this condition occurs, the domain nameserver typically provides an NXDOMAIN response indicating that a corresponding IP address does not exist. An example NXDOMAIN response can be as follows:

Host example.nxdom not found: 3(NXDOMAIN)

However, internet service providers ("ISPs") or other network entities have been known to hijack NXDOMAIN responses to display advertisements, collect statistics, or even potentially perform cross-site scripting. For example, an domain nameserver provided by an ISP (referred to as "ISP domain nameserver") can detect an NXDOMAIN for a search query (e.g., "example.nxdom") from a client device. Instead of providing the example NXDOMAIN response shown above, the ISP domain nameserver can provide an IP address identifying a website selected by the ISP. The client device can then be automatically directed to the website that is configured for displaying advertisements, phishing, cross-site scripting, or other illicit purposes. Such NXDOMAIN hijacking can negatively impact security of the domain name systems and/or intrude upon user privacy.

Several embodiments of the disclosed technology can provide defense against such NXDOMAIN hijacking by bypassing ISP domain nameservers. In certain embodiments, an application (e.g., a web browser) or an application component (e.g., Google Toolbar) configured to implement a search box can include or otherwise provided with a local caching server. In operation, the application or application component can invoke the local caching server to resolve received search queries and determine whether any search queries may cause NXDOMAIN. In response to receiving a search query that causes NXDOMAIN, the application can provide an NXDOMAIN response to a user. In addition to or in lieu of providing the NXDOMAIN response, the local caching server can also identify an IP address associated with a search engine (e.g., Google Search), and transmit the search query to the search engine. In other embodiments, the application can also include one or more IP addresses of trusted caching servers hardcoded or otherwise configured in the application or application component to resolve the received search query. By bypassing ISP domain nameservers, the ISPs can be prevented from hijacking and redirecting network traffic to potentially harmful websites.

Several embodiments of the disclosed technology can also detect NXDOMAIN hijacking and provide notifications or warnings thereof. For example, in certain embodiments, the application or application component can transmit a first DNS query to an ISP domain nameserver provided by an ISP and a second DNS query to a local caching server on the client device and/or a trusted caching server on a computer network. The application can then compare the received DNS responses corresponding to the first and second DNS queries. If the DNS response do not match, e.g., having different IP addresses, the application can provide a notification to a user and/or request confirmation from the user to continue to the IP address provided by the ISP domain nameserver associated with the ISP. As such, several embodiments of the disclosed technology can at least reduce if not prevent being directed to unwanted websites.

DETAILED DESCRIPTION

Figure 1A:
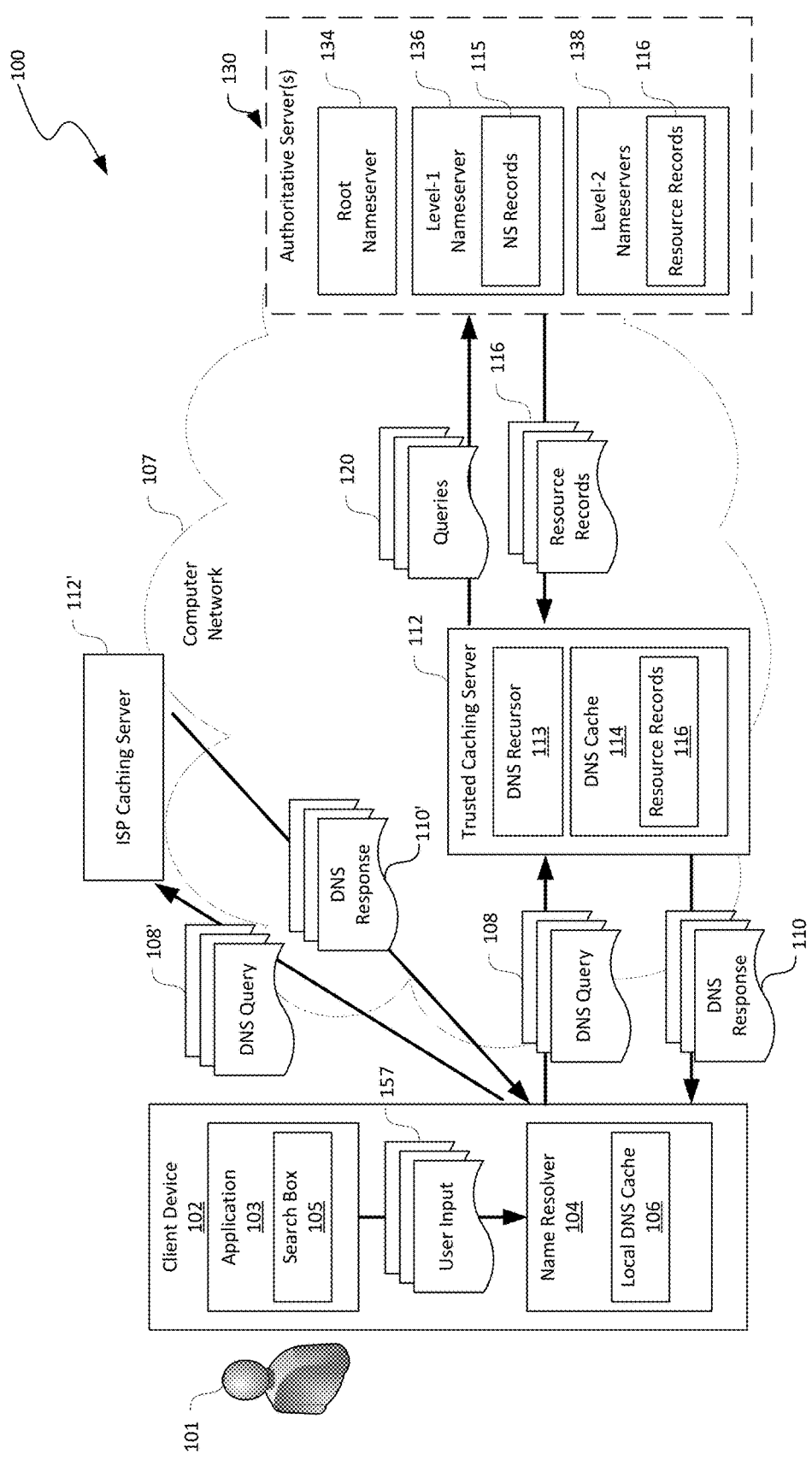
FIGS. 1A and 1B are schematic diagrams illustrating a computing framework having defense capability against NXDOMAIN hijacking in accordance with embodiments of the disclosed technology.

Certain embodiments of systems, devices, components, modules, routines, and processes for providing defense against NXDOMAIN hijacking in domain name systems are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1A-9.

As used herein, the term "domain name system" or "DNS" generally refers to a computer system configured to translate alphanumerical domain names into numerical IP addresses to effect communications in a computer network. In the following description, such translation operation can be referred to as "name resolution" or "resolving a domain name." Translation records can be referred to resource records. A domain name system can include one or more operatively coupled DNS servers containing a database of domain name translations. Example DNS servers can include authoritative servers and caching servers organized into a hierarchy. One example DNS computing framework is described below with reference to FIG. 1.

An "authoritative server" generally refers to a DNS server configured to return authoritative domain name translations for particular domain names in response to DNS queries. For example, an authoritative server can contain a mapping of URLs of domain names to IP addresses defined by domain administrators or other authorized entities. In another example, an authoritative server can also contain a mapping of a host portion of email addresses (e.g., "@hotmail.com") to IP addresses. In a further example, an authoritative server can also contain name server ("NS") records of other authoritative servers to which resolution authority is delegated. Authoritative servers for a domain or host may be configured by DNS hosting companies or network registrars, such as, for example, Amazon, GoDaddy, or Verisign.

A "caching server" or "recursive server" generally refers to a DNS server configured to resolve a domain name of a target domain by, for example, recursively querying authoritative servers. For instance, each part of the URL "www.example.com" has a specific DNS server (or group of servers) that is authoritative. A root server can contain network addresses of authoritative servers for top-level domains such as ".com," ".net," or ".org." In one example resolution operation, a caching server can first query the root server for network addresses of authoritative servers for the ".com" domain. Then, the caching server queries the ".com" authoritative server for network addresses of authoritative servers for "example.com" domain. The caching server can then query the authoritative servers for the "example.com" domain for an IP address associated with the domain name "www.example.com."

Also used herein, the term a "DNS query" generally refers to an electronic data package representing a request from, e.g., a caching server to an authoritative server for retrieving DNS records. For example, an A-type DNS query is a request for retrieving a 32-bit IPv4 address of a target domain name. An AAAA-type DNS query is a request for retrieving a 128-bit IPv6 address of a target domain name. An name server ("NS")-type query can be a request for retrieving an NS record that includes URLs of authoritative servers for a target domain name.

As used herein, the term "search box" or a "search field" generally refers to a graphical element used in web browsers, web sites, or other computer programs executing on a computing device. A search box can be a single-line text box that accepts user input to be searched in a database. As described in more detail later, in certain embodiments, in response to determining that a user input is a domain name with a corresponding IP address, a search box can redirect the computer program to the corresponding IP address. In response to determining that a user input causes an NXDOMAIN condition, the search box can identify a search engine and transmit the user input as a search query to the search engine in addition to or in lieu of an NXDOMAIN response.

As used herein, the term "NXDOMAIN" generally refers to a condition in which a domain name does not have a corresponding DNS record in a domain name system. For instance, a domain name (e.g., "example.nxdom") can be misspelled, expired, or otherwise does not have a corresponding IP address in the domain name system. As described in more detail below, several embodiments of the disclosed technology can at least reduce if not prevent NXDOMAIN hijacking by bypassing caching servers provided by ISPs. As such, security of the domain name system can be improved over conventional domain name systems.

As discussed herein, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

FIG. 1A is a schematic diagram illustrating a DNS computing framework 100 having defense capability against NXDOMAIN hijacking in accordance with embodiments of the disclosed technology. As shown in FIG. 1A, the computing framework 100 can include a client device 102 associated with a user 101, a trusted caching server 112, an ISP caching server 112', and one or more authoritative servers 130 interconnected by a computer network 107. The computer network 107 can include the Internet, a local area network, a metropolitan area network, a wide area network, and/or other suitable types of network.

The client device 102, the trusted caching server 112, the ISP caching server 112', and the authoritative servers 130 can each include a processor and memory (not shown) containing instructions for execution by the processor to provide certain software components discussed in more detail below. Even though particular components of the computing framework 100 are shown in FIG. 1A, in other embodiments, the computing framework 100 can also include additional and/or different components. For example, the computing framework 100 can include additional caching servers (not shown), client devices (not shown), and/or other suitable components. In other examples, the client device 102 can also include an integrated trusted caching server 112, as described in more detail below with reference to FIGS. 2A-2B.

The client device 102 can include a desktop, a laptop, a tablet, a smartphone, and/or other suitable types of computing device. For example, the client device 102 can be an iPhone or iPad provided by Apple, Inc. of Cupertino, Calif., an Android device, a Chromebook device, a Windows device, or any other suitable devices. In the illustrated embodiment of FIG. 1A, the client device 102 can include an application 103 having a search box 105 and a name resolver 104 with a local DNS cache 106. In certain embodiments, the search box 105 can be an integral component of the application 103. In other embodiments, the search box 105 can be an extension to the application 103 and can be installed/uninstalled by the user 101 to be incorporated into the application 103. In further embodiments, the client device 102 may also include other suitable hardware and/or software components.

The application 103 can include a web browser, an email client, or other types applications incorporating the search box 105. The name resolver 104 can be configured to determine network addresses (e.g., IP addresses) associated with domain names (e.g., "www.example.com"). The name resolver 104 may be a part of an operating system, the application 103, or other applications (not shown) executing on the client device 102. The local DNS cache 106 can be configured to store resource records of previously resolved domain names. In one embodiment, the name resolver 104 can determine an IP address by accessing a resource record stored in the local DNS cache 106. In other embodiments, when a resource record does not exist in the local DNS cache 106, the name resolver 104 can resolve the received domain name without using the ISP caching server 112'. Instead, in certain embodiments, the name resolver 104 can query the trusted caching server 112 for the desired resource record 116 by, for example, transmitting a DNS query 108 to the caching server 112 and receiving a DNS response 110 from the caching server 112.

In one embodiment, a web address, IP address, and/or other suitable network identification of the trusted caching server 112 can be hardcoded into the application 103 or an application component associated with the search box 105. During network setup with an ISP, the application 103 (or an operating system of the client device 102) can be configured to prevent the ISP from replacing the trusted caching server 112, for example, in the DHCP settings with ISP caching servers. In another embodiment, the trusted caching server 112 can be a public caching server and be configured manually by the user 101 for use by the application 103 and/or other applications executing on the client device 102. In further embodiments, the name resolver 104 can initially determine if the user 101 has configured a caching server. In response to determining that the user 101 has not configured a caching server, the name resolver 104 can locate and utilize the trusted caching server 112 via, for example, a web search, a local database look up, or other suitable mechanisms. An example user interface useful for configuring caching servers is described in more detail below with reference to FIG. 3.

The trusted caching server 112 can be provided by a trusted entity, for example, a government unit, a corporation, an certification organization, or other suitable entities. In certain embodiments, the trusted caching server 112 can be public, i.e., open to all users on the Internet. In other embodiments, the trusted caching server 112 may be private and accessible by the user 101, an organization (e.g., an corporation), or other suitable entities. In further embodiments, the trusted caching server 112 can be incorporated into the application 103, as described in more detail below with reference to FIGS. 2A and 2B.

The authoritative servers 130 can include a plurality of DNS servers arranged in a hierarchy. For example, as shown in FIG. 1A, the authoritative servers 130 can include a root nameserver 134, a level-1 nameserver 136 subordinate to the root nameserver 134, and a level-2 nameservers 138 subordinate to the level-1 nameserver 136. Even though a three-level hierarchy of DNS servers 130 is shown in FIG. 1A, in other embodiments, the authoritative servers 130 can include one, two, four, or any other suitable number of levels and/or servers. For example, the authoritative servers 130 can also include a level-3 nameserver (not shown) subordinate to the level-2 nameserver 138.

As shown in FIG. 1A, in the hierarchy of the authoritative servers 130, the root nameserver 134 can contain a resource record (not shown) containing a network address for the level-1 nameserver 136 corresponding to, e.g., a top-level domain such as ".com". The level-1 nameserver 136 can include a NS record 115 containing URLs for the level-2 nameservers 138 corresponding to a domain name, e.g., "example.com." The level-2 nameservers 138 can then include a resource record 116 containing an IP address (e.g., 192.168.0.1) that corresponds to a server associated with the domain name "www.example.com."

As shown in FIG. 1A, the caching server 112 can include a DNS recursor 113 operatively coupled to a DNS cache 114. The DNS recursor 113 can be configured to recursively resolve a domain name of a target domain by transmitting queries 120 to and receiving NS records 115 or resource records 116 from the one or more authoritative servers 130. The DNS cache 114 can be configured to store any resource records 116 previously resolved by the DNS recursor 113 for a period of time, for example, as specified by a time-to-live value. In certain embodiments, a value of the time-to-live period can be set by one or more of the authoritative servers 130. In other embodiments, the time-to-live value may be set by an administrator, an application, or other suitable entities.

The trusted caching server 112 can be configured to return a copy of the cached resource records 116 as a DNS response 110 in response to a DNS query 108 from the client device 102. In one embodiment, the caching server 112 can determine if a resource record 116 corresponding to a domain name already exists in the DNS cache 114. If the resource record 116 already exists in the DNS cache 114, the caching server 112 transmits a copy of the resource record 116 as a DNS response 110 to the client device 102 via the computer network 107. If a resource record 116 does not exist in the DNS cache 114, the caching server 112 can invoke the DNS recursor 113 to retrieve a copy of the resource record 116 from the authoritative servers 130.

In operation, the client device 102 can utilize the trusted caching server 112 to avoid NXDOMAIN hijacking by the ISP caching server 112'. For example, the user 101 can enter a user input 157 into the search box 105 of the application 103 executing on the client device 102. In certain embodiments, the user input 157 can be valid domain names (e.g., "www.google.com"). In other embodiments, the user input 157 can be domain names that can cause NXDOMAIN condition (e.g., "example.nxdom"). The name resolver 104 at the client device 102 can first determine if a resource record 116 for the requested domain name already exists or cached in the local DNS cache 106. If one already exists, the client device 102 can initiate network operations to servers associated with the user input 157 based on the cached resource record 116.

If one does not exist, the client device 102 can consult the trusted caching server 112 for a corresponding resource record 116 instead of the ISP caching server 112'. In response to the received request, the trusted caching server 112 can first determine if a resource record 116 is available in the DNS cache 114. If one is available, the trusted caching server 112 can return the resource record 116 as a DNS response 110. If one is not available, the trusted caching server 112 can invoke the DNS recursor 113 to recursively query the authoritative servers 130. For example, the trusted caching server 112 can first query the root nameserver 134 for a resource record containing a network address of the level-1 nameserver 136 (e.g., 198.41.0.4). Then, the caching server 112 can query the level-1 nameserver 136 for a NS record 115 containing a network address of the level-2 nameserver 138. The trusted caching server 112 can then query an authoritative server in the level-2 nameservers 138 to retrieve a copy of the resource record 116 containing a network address of the requested domain name (e.g., 192.168.0.1) that corresponds to a server associated with the domain name "www.google.com." if a resource record 116 corresponding to the user input 157 does not exist, the trusted caching server 112 can return an NXDOMAIN response to the name resolver 106 on the client device 102.

Figure 1B:
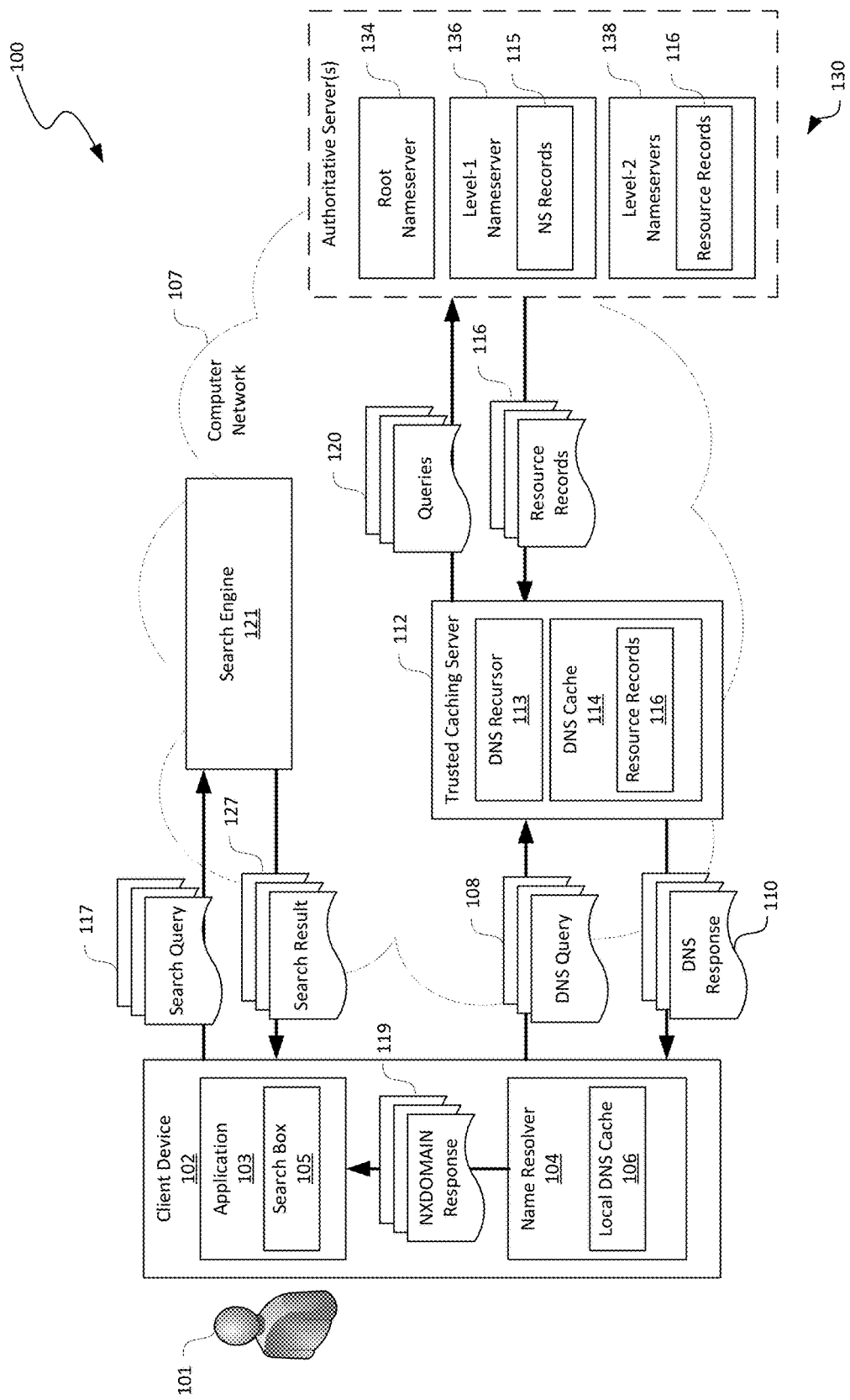

In response to an NXDOMAIN response, as shown in FIG. 1B, the name resolver 104 can forward the NXDOMAIN response 119 to the application 103 to be displayed to the user 101. In certain embodiments, the application 103 can also determine a search engine 121 (or an IP address thereof) with the name resolver 104 and transmit the received user input 157 in the search box 105 as a search query 117 to the search engine 121. In response, the search engine 121 can provide search result 127 to the application 103 to be outputted to the user 101. In other embodiments, the foregoing operations by the application 103 may be omitted. Instead, the application 103 simply outputs the NXDOMAIN response 119 to the user 101.

As such, several embodiments of the disclosed technology can prevent NXDOMAIN hijacking by bypassing the ISP caching server 112' and instead utilizing the trusted caching server 112. In certain embodiments, the application 103 can also be configured to monitor for and detect NXDOMAIN hijacking by testing DNS responses from the ISP caching server 112' with that from the trusted caching server 112. For example, as shown in FIG. 1A, the name resolver 104 can transmit separate DNS queries 108 and 108' to the trusted caching server 112 and the ISP caching server 112', respectively. The name resolver 104 can then receive and compare the DNS responses 110 and 110' from the trusted caching server 112 and the ISP caching server 112', respectively. If the DNS responses 110 and 110' do not match, for example, one contains an IP address from the ISP caching server 112' and then other contains an NXDOMAIN response from the trusted caching server 112, the application 103 can indicate to the user 101 of NXDOMAIN hijacking. In certain embodiments, the application 103 can then prompt the user 101 for permission to continue to the IP address provided by the ISP caching server 112'. In other embodiments, the application 103 can discard the IP address automatically.

Figure 2A:
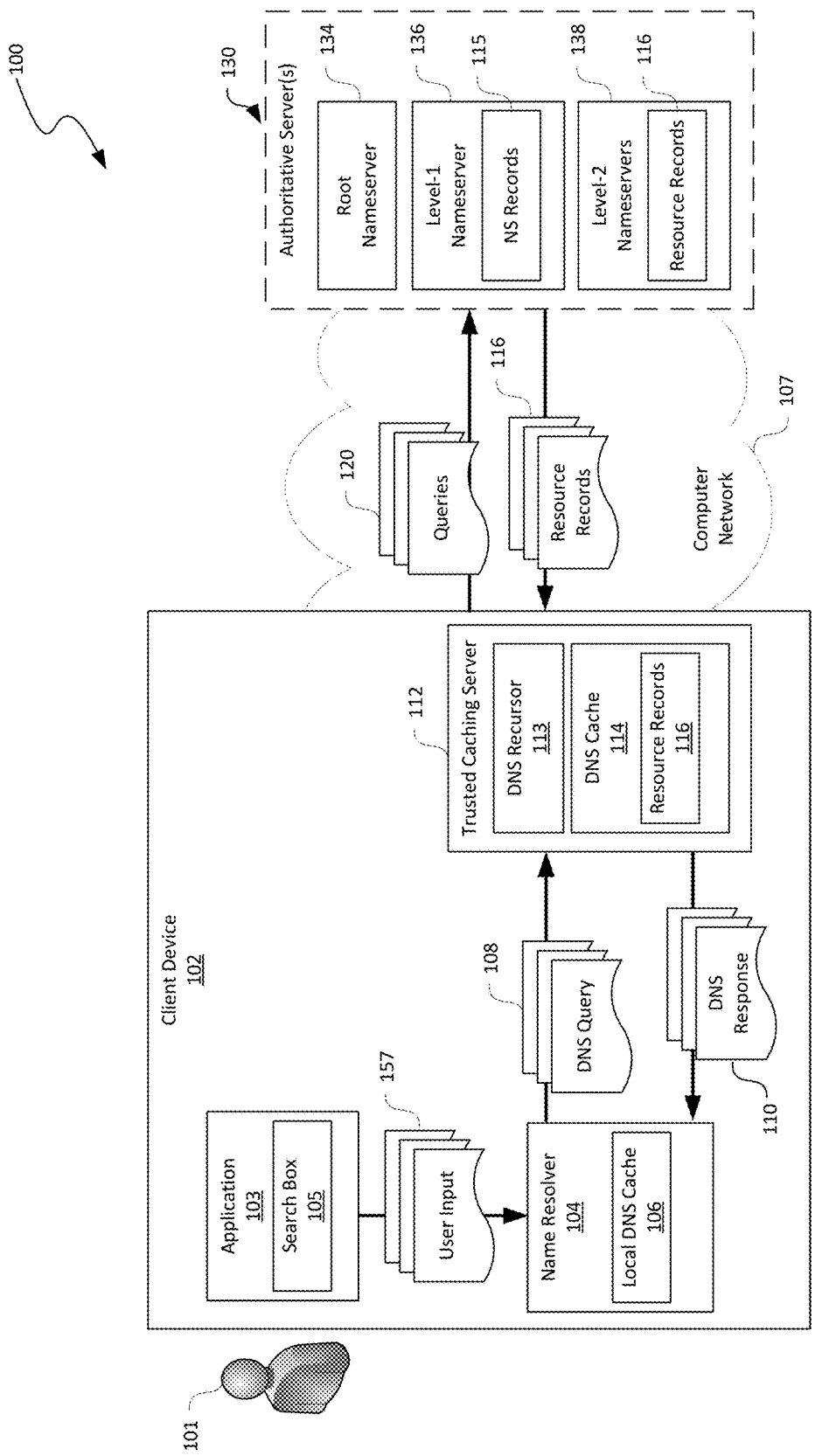
FIGS. 2A and 2B are schematic diagrams illustrating another computing framework having defense capability against NXDOMAIN hijacking in accordance with embodiments of the disclosed technology.
Figure 2B:
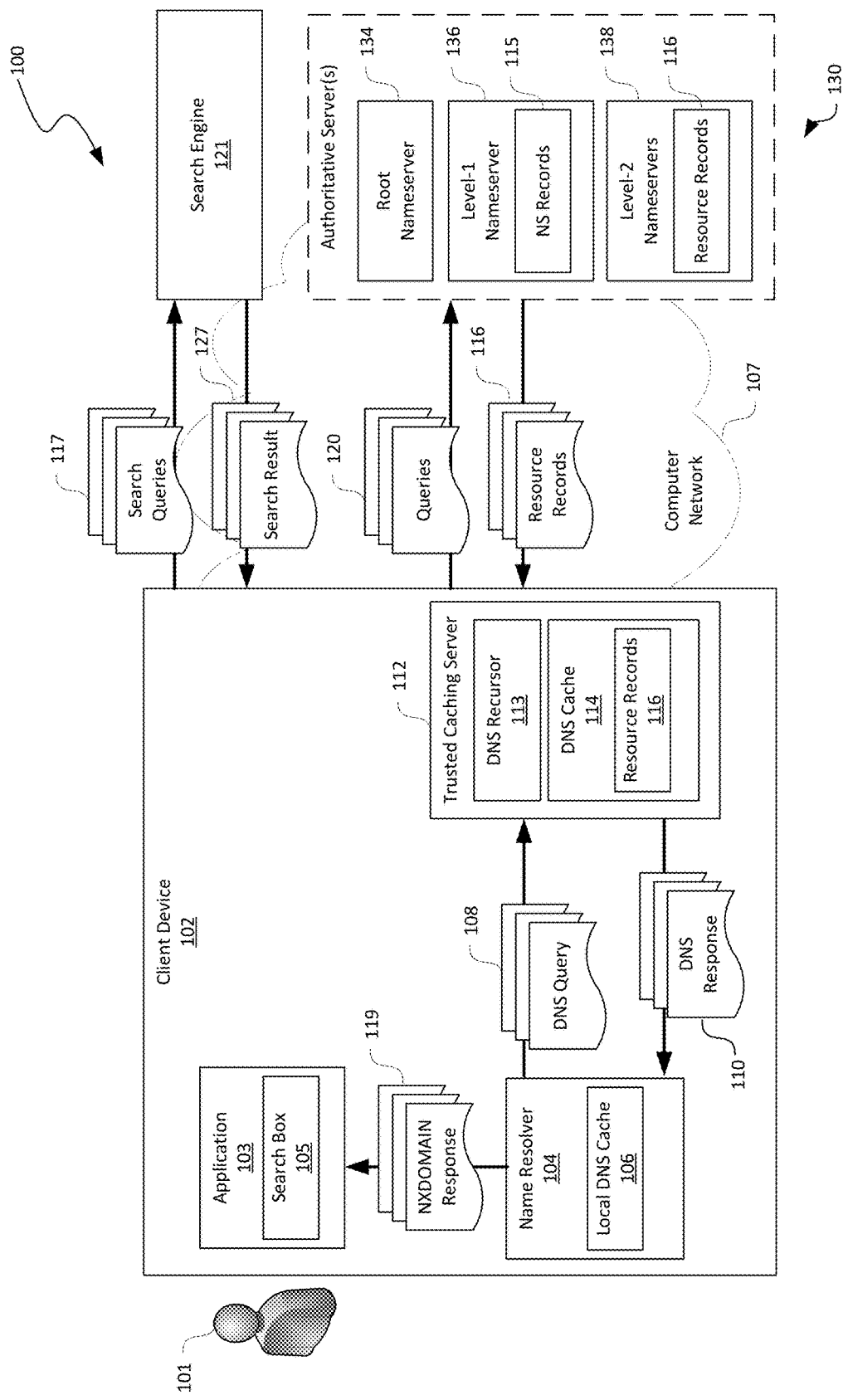

Even though the trusted caching server 112 is shown as a separate component from the application 103 in FIGS. 1A and 1B, in certain embodiments, the trusted caching server 112 can be executing on the client device 102, as shown in FIGS. 2A and 2B. In one embodiment, the trusted caching server 112 can be an integral component of the search box 105. In another embodiment, the trusted caching server 112 can be an extension to the application 103. In yet another embodiment, the trusted caching server 112 can be a stand-alone caching server executing on the client device 102 and accessible by the search box 105. In further embodiments, the trusted caching server 112 can be executing on the client device 102 in other suitable manners.

Figure 3:
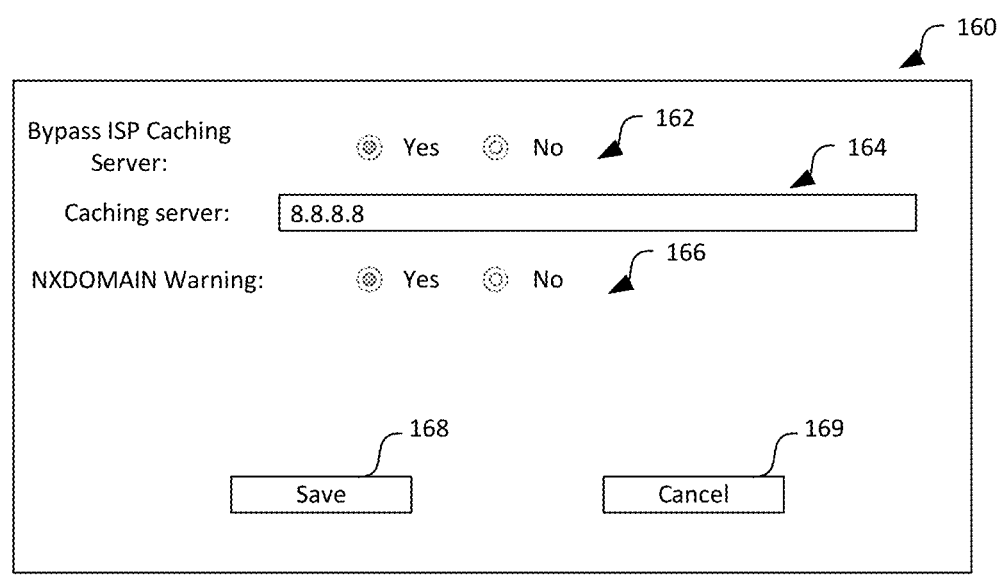
FIG. 3 is an example user interface useful for configuration of caching server in accordance with embodiments of the disclosed technology.

FIG. 3 is an example user interface 160 useful for configuration of a caching server in accordance with embodiments of the disclosed technology. As shown in FIG. 3, the user interface 160 can include multiple selection and/or data input fields. For example, the user interface 160 can include a selection field 162 configured to allow the user 101 (FIGS. 1A-2B) to select whether to bypass the ISP caching server 112'. In response to a user selection to bypass the ISP caching server 112', in the illustrated embodiment, the user interface 160 can also include a data input field 164 configured to accept a user-selected caching server. In the illustrated example, the caching server at IP address "8.8.8.8" was used for illustration purposes. In other examples, the user 101 can also enter a domain name (e.g., "trustedcachingserver.com"), a file path to a local caching server, or other suitable identification of the trusted caching server 112 (FIGS. 1A-2B).

Optionally, as shown in FIG. 3, the user interface 160 can also include another selection field 166 configured to allow the user 101 to select whether to receive NXDOMAIN hijacking warnings. As discussed with reference to FIG. 1A, in certain embodiments, the application 103 executing on the client device 102 can be configured to monitor for and detect NXDOMAIN hijackings. If the user 101 selects to receive NXDOMAIN hijacking warnings, the application 103 can be configured to display text, graphical elements, or other suitable indications of such warnings. Illustrative examples of such warnings are described in more detail with reference to FIGS. 4 and 5.

Figure 4:
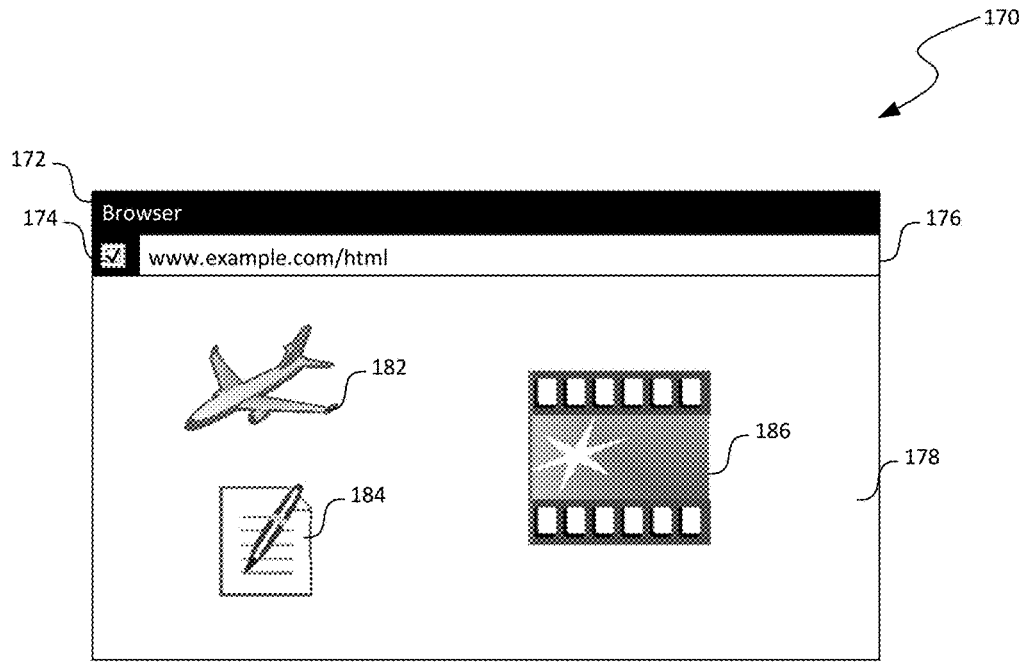
FIGS. 4 and 5 are example user interfaces illustrating normal operation and NXDOMAIN hijacking, respectively, in accordance with embodiments of the disclosed technology.
Figure 5:
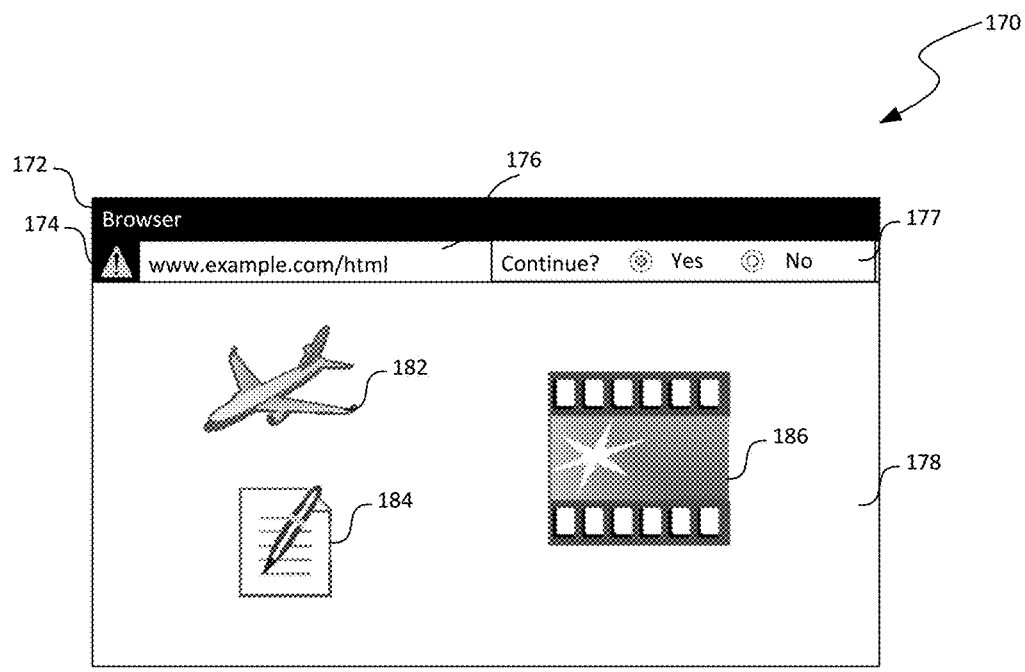

FIGS. 4 and 5 are example user interfaces 170 illustrating normal operation and NXDOMAIN hijacking, respectively, in accordance with embodiments of the disclosed technology. As shown in FIG. 4, the user interface 170 can include a title bar 172, an address bar 176 proximate an NXDOMAIN indicator 174, and a content area 178 for displaying suitable contents. For instance, as shown in FIG. 4, the displayed contents can include an image 182, a text document 184, and a video 186. In other embodiments, the displayed contents can include additional and/or different contents.

In the illustrated embodiment, the NXDOMAIN indicator 174 is shown as a graphical element. For example, as shown in FIG. 4, the NXDOMAIN indicator 174 can be shown as a check mark inside a square background indicating normal operation. As shown in FIG. 5, the NXDOMAIN indicator 174 can be shown as an exclamation mark inside a triangle indicating NXDOMAIN hijacking. In certain embodiments, the user interface 170 can also display a prompt 177 when NXDOMAIN hijacking is detected. The prompt 177 can be configured to accept user input regarding whether to proceed to, for example, an IP address provided by the ISP caching server 112' (FIGS. 1A and 2A).

Figure 6A:
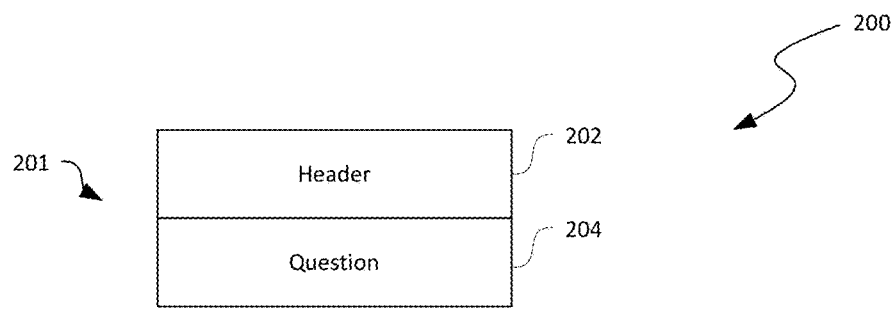
FIG. 6A-6C are schematic diagrams illustration an example data structure suitable for the DNS query or DNS response of FIGS. 1A-2B in accordance with embodiments of the disclosed technology.

FIG. 6A is a schematic diagram illustrating an example data structure 200 suitable for the query 120 or the DNS query 108 of FIGS. 1A-2B in accordance with embodiments of the disclosed technology. As shown in FIG. 6A, the data structure 200 can include a header field 202 and a question field 204. The header field 202 can include parameters that describe the type of query and which fields are contained in the query. For example, the header field 202 can contain a query identifier, a one-bit field that specifies whether the data structure 200 is a query or a response, or other suitable parameters.

Figure 6B:
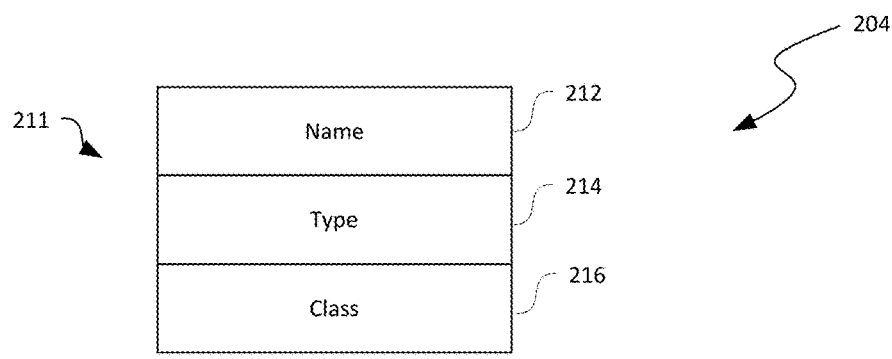

The question field 204 can contain a question for a DNS server (e.g., the level-1 nameserver 136 of FIG. 2A). FIG. 6B is a schematic diagram illustration an example data structure suitable for the question field 204 of FIG. 6A in accordance with embodiments of the disclosed technology. As shown in FIG. 6B, the question field 204 can include a name field 212, a type field 214, and a class field 216. The name field 212 can contain a domain name (e.g., "www.example.com") represented as a sequence of labels (e.g., "example" and "com"). The type field 214 can contain data specifying a query type, for example, data indicating an NS-type query. The class field 216 can contain data specifying the class of the query (e.g., "IN" indicating Internet). In other embodiments, the question field 204 can also include other suitable fields.

Figure 6C:
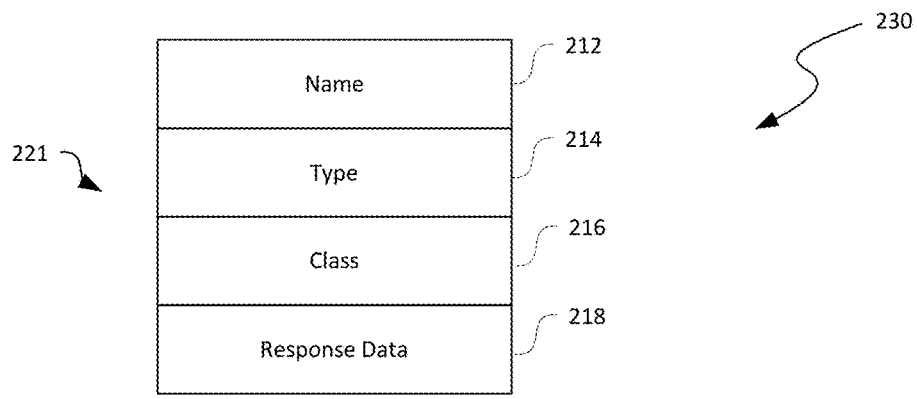

FIG. 6C is a schematic diagram illustration an example data structure 230 suitable for the NS record 115 or resource record 116 of FIGS. 1A-2B in accordance with embodiments of the disclosed technology. As shown in FIG. 6C, the data structure 230 can include certain fields generally similar to that of FIG. 6B. For example, the data structure 230 can include a name field 212, a type field 214, and a class field 216. The data structure 230 can also include a response data field 218 containing, for example, URLs of the first and second active nameservers 138 of FIGS. 1A-2B. In other embodiments, the data structure 230 can also include a time-to-live field, a length of response data field, or other suitable fields.

Figure 7A:
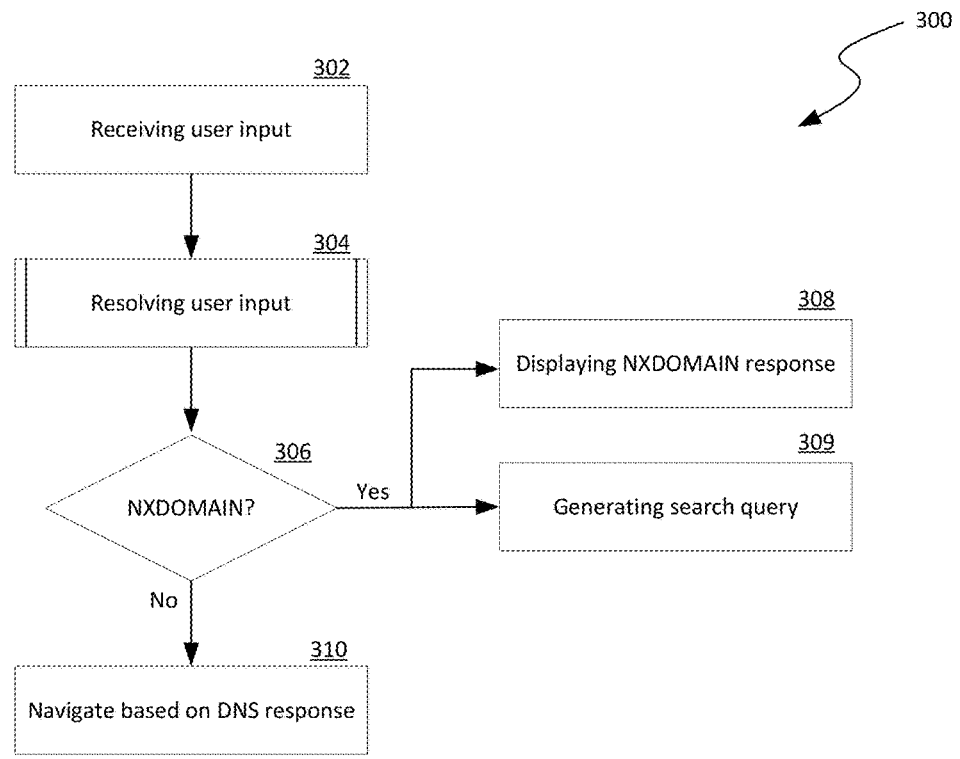
FIGS. 7A-7B are flow diagrams illustrating embodiments of a process of protecting against NXDOMAIN hijacking in a DNS system in accordance with embodiments of the disclosed technology.

FIG. 7A is a flow diagram illustrating embodiments of a process 300 of protecting against NXDOMAIN hijacking in accordance with embodiments of the disclosed technology. Even though various embodiments of the process 300 are described below with reference to the computing framework 100 of FIGS. 1A-2B, in other embodiments, the process 300 may be performed with other suitable types of computing frameworks, systems, components, or modules.

As shown in FIG. 7A, the process 300 can include receiving user input at stage 302. In certain embodiments, receiving user input can include receiving a text string in a search box 105 (FIG. 1A) of the application 103 (FIG. 1A). In other embodiments, receiving user input can also include receiving a text string in an address bar of a web browser or other suitable applications. The process 300 can then include resolving the received user input without using a caching server provided by an ISP at stage 304. In one embodiment, the application 103 can contain an integrated caching server 112 (FIG. 2A) executing on the client device 102 (FIG. 2A). As such, the received user input can be resolved as a DNS query using the integrated caching server contained in the application 103 and without using the ISP caching server 112' (FIG. 2A) provided by the ISP.

In another embodiment, the application 103 can identity a caching server (e.g., the trusted caching server 112 of FIG. 1A) hardcoded into the application 103. As such, the received user input can be resolved as a DNS query using the identified caching server hardcoded into the application 103 and without using the ISP caching server 112' (FIG. 2A) provided by the ISP. In yet another embodiment, the application 103 can contain a configurable caching server identified by the user 101, for example, via the user interface 160 of FIG. 3. As such, the received user input can be resolved as a DNS query using the configurable caching server identified by the user 101. An example process of resolving the user input is described in more detail below with reference to FIG. 7B.

The process 300 can then include a decision stage 306 to determine whether the resolution of the received user input results in an NXDOMAIN condition at stage 306. In response to an NXDOMAIN condition, the process 300 can include one or more of display an NXDOMAIN response at stage 308 or generating a search query to a search engine based on the received user input at stage 309. In response to an absence of an NXDOMAIN condition, the process 300 can include navigating to an IP address corresponding to the user input and as a result of the resolution operation at stage 304.

Figure 7B:
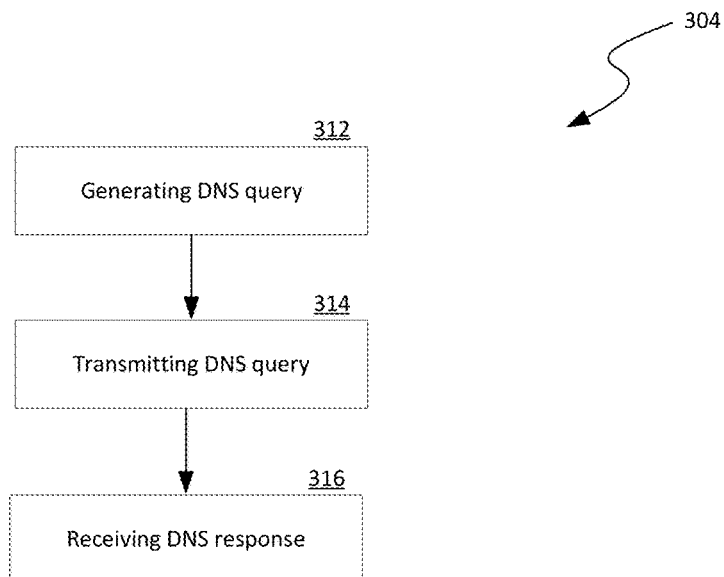

FIG. 7B is a flow diagram illustrating embodiments of a process 304 of resolving user input in accordance with embodiments of the disclosed technology. As shown in FIG. 7B, the process 304 can include generating a DNS query, for example, as shown in FIGS. 6A-6C, based on the received user input at stage 312. The process 304 can then include transmitting the DNS query to a trusted caching server, for example, the trusted caching server 112 of FIG. 1A either identified by the application 103 (FIG. 1A) or executing on the client device 102 (FIG. 1A) at stage 314. The process 304 can also include receiving a DNS response from the trusted caching server 112 at stage 316.

Figure 8:
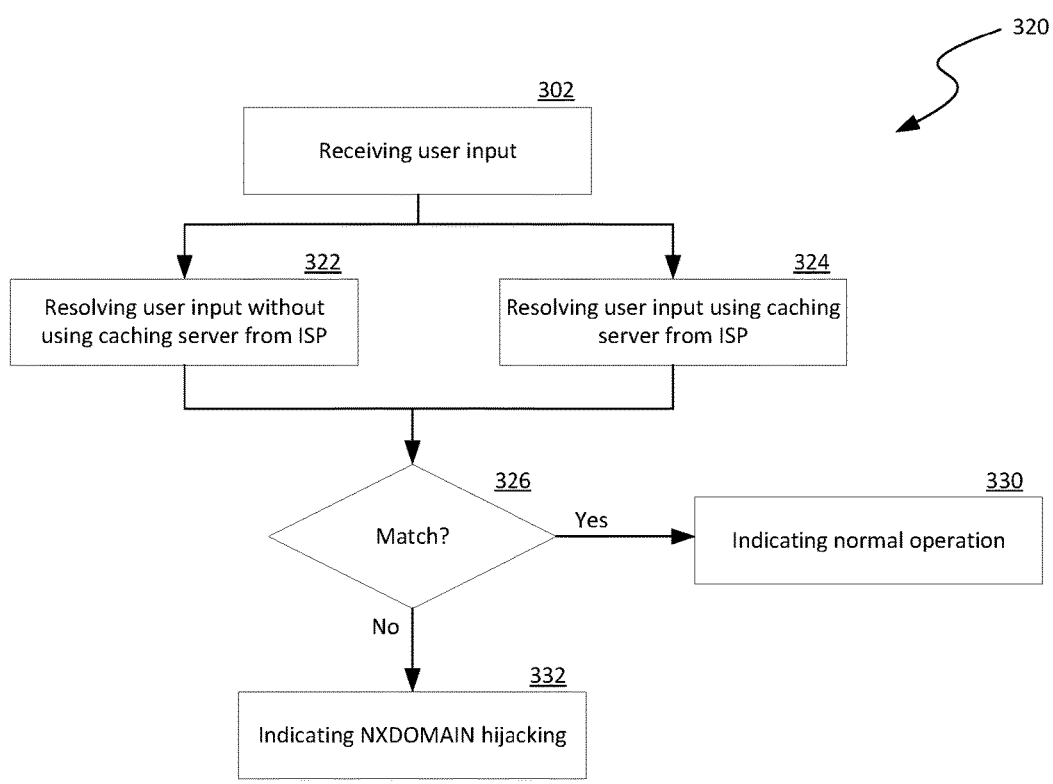
FIG. 8 is a flow diagram illustrating embodiments of a process of detecting NXDOMAIN hijacking in a DNS system in accordance with embodiments of the disclosed technology.

FIG. 8 is a flow diagram illustrating embodiments of a process 320 of detecting NXDOMAIN hijacking in a DNS system in accordance with embodiments of the disclosed technology. The process 320 can include certain operations generally similar to those described above with reference to FIGS. 7A and 7B. As such, similar reference numbers generally refer to similar operations whose description may be omitted for clarity.

As shown in FIG. 8, the process 320 includes receiving user input at stage 302. The process 320 can also include resolving the received user input without using a caching server provided by an ISP at stage 322, by, for example, utilizing the trusted caching server 112 in FIG. 1A or 2A. The process 320 can also include resolving the receiving user input using a caching server provided by the ISP, for example, the ISP caching server 112'. The process 320 can then include a decision stage 326 to determine whether DNS responses from stages 322 and 324 substantially match each other. In one embodiment, the DNS responses substantially match each other if the DNS responses contain the same IP address. In other embodiments, the DNS responses can be deemed substantially match each other based on other suitable criteria.

In response to determining that the DNS responses do not match each other, for example, one contains an IP address and another contains an NXDOMAIN response, the process 320 includes indicating NXDOMAIN hijacking at stage 332, by, for example, displaying a warning as shown in FIG. 5. In response to determining that the DNS responses substantially match each other, the process 320 includes indicating normal operation at stage 330, by, for example, as shown in FIG. 4.

Figure 9:
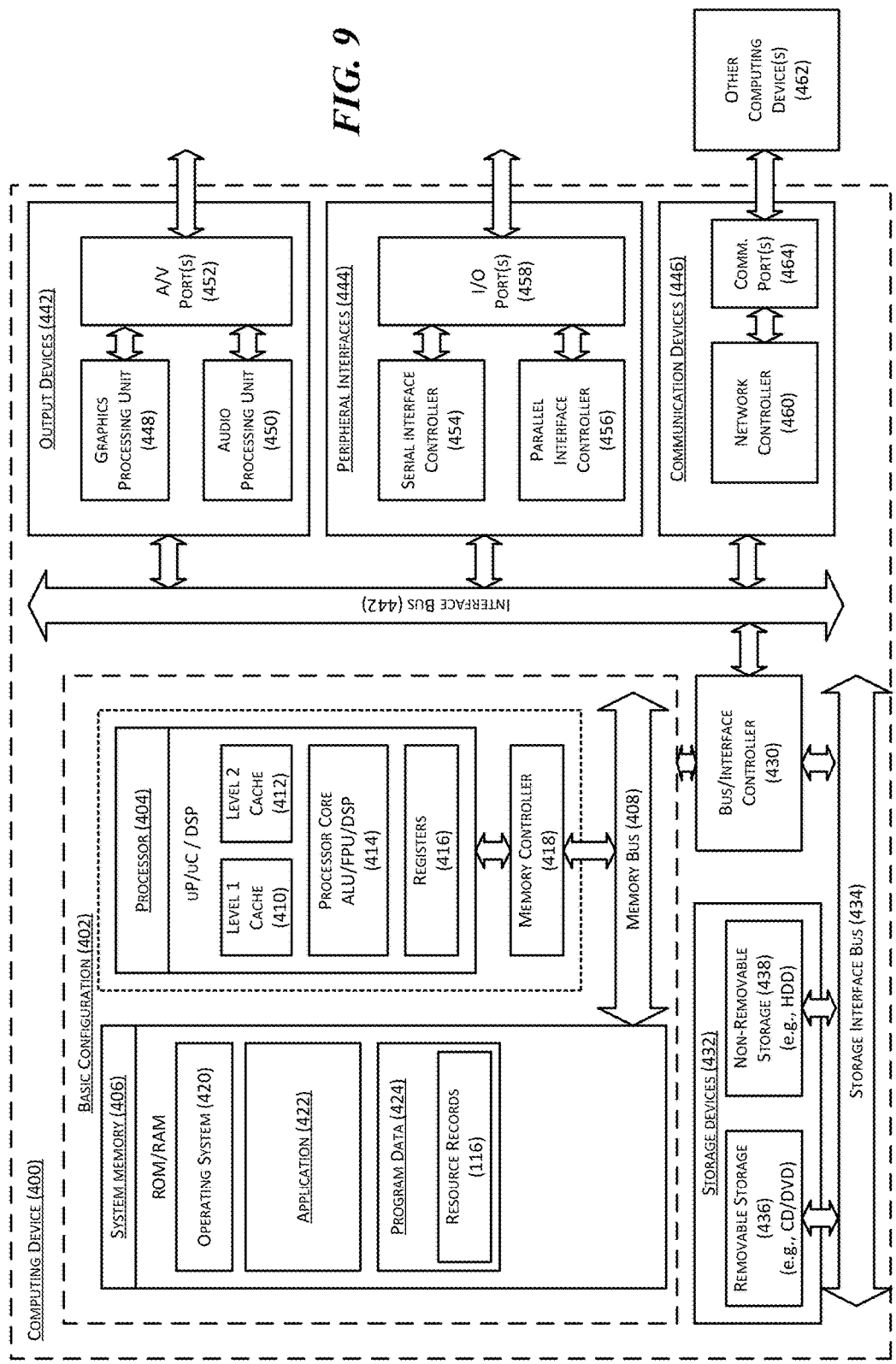
FIG. 9 is a computing device suitable for certain components of the computing frameworks in FIGS. 1A-2B.

FIG. 9 is a computing device 400 suitable for certain components of the computing framework 100 in FIGS. 1A-2B. For example, the computing device 400 may be suitable for the level-1 nameserver 136, level-2 nameserver 138, the client device 102, and the trusted caching server 112 of FIGS. 1A-2B. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (μP), a microcontroller (μC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more applications 422, and program data 424. The program data 424 may include, for example, the resource records 116. This described basic configuration 402 is illustrated in FIG. 9 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more AN ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

I claim:

1. A method for resolving domain names in a domain name system ("DNS"), comprising:

receiving a user input to a search box in an application executing on a computing device connected to the Internet via a facility provided by an Internet service provider ("ISP");

when bypassing one or more caching servers provided by the ISP is selected, determining whether the application contains a configurable caching server identified as a configured caching server;

in response to determining that the application contains a configurable caching server identified as the configured caching server, resolving the received user input to the search box as a DNS query using the configured caching server without using the one or more caching servers provided by the ISP; and in response to determining that the application does not contain a configurable caching server identified as the configured caching server, locating a trusted caching server via a web search or local database lookup and resolving the received user input to the search box as a DNS query using the trusted caching server without using the one or more caching servers provided by the ISP;

based on a result of resolving the received user input using the configured caching server or the trusted caching server, determining whether the DNS query causes an NXDOMAIN condition under which the DNS query does not have a corresponding DNS record in the domain name system; and in response to determining that the DNS query causes an NXDOMAIN condition, displaying, via the application, an NXDOMAIN response on the computing device indicating that the received user input does not have a corresponding IP address in the domain name system.

2. The method of claim 1, further comprising:
in response to determining that the DNS query does not cause an NXDOMAIN condition,
obtaining an IP address corresponding to the user input; and
directing the application to a website associated with the identified IP address.

3. The method of claim 1 wherein:
the application contains an integrated caching server executing on the computing device as the configured caching server; and
resolving the received user input includes resolving the received user input to the search box as the DNS query using the integrated caching server contained in the application.

4. The method of claim 1 wherein:
the application identifies a caching server hardcoded into the application as the configured caching server; and
resolving the received user input includes resolving the received user input to the search box as the DNS query using the identified caching server hardcoded into the application.

5. The method of claim 1 wherein:
the trusted caching server is a private caching server accessible to the user in an organization.

6. The method of claim 1 wherein:
the DNS query is a first DNS query;
resolving the received user input includes resolving the received user input to the search box as the first DNS query to generate a first DNS response without using the one or more caching servers provided by the ISP;
the method further includes:
resolving the received user input to the search box as a second DNS query using the one or more caching servers provided by the ISP to generate a second DNS response;
determining whether the first DNS response matches the second DNS response;
in response to determining that the first DNS response does not match the second DNS response, indicating NXDOMAIN hijacking to the user in the application executing on the computing device; and
in response to determining that the first DNS response does match the second DNS response, indicating no NXDOMAIN hijacking to the user in the application executing on the computing device.

7. The method of claim 1, further comprising:
in response to determining that the DNS query causes an NXDOMAIN condition,
identifying a search engine associated with the search box; and
transmitting, from the application, the received user input as a search query to the search engine via the Internet using the facility provided by the ISP.

8. A computing device having a processor and a memory containing instructions executable by the processor to cause the computing device to:
receive a domain name to a web browser executing on the computing device connected to the Internet via a facility provided by an Internet service provider ("ISP") having an ISP caching server;
when bypassing one or more caching servers provided by the ISP is selected,
determine whether the web browser contains a configurable caching server identified as a configured caching server;
in response to determining that the web browser contains a configurable caching server identified as the configured caching server, resolve the received domain name using the user configured caching server and without using the ISP caching server; and
in response to determining that the web browser does not contain a configurable caching server identified as the configured caching server, locate a trusted caching server via a web search or local database lookup and resolving the received user input to the search box as a DNS query using the trusted caching server without using the ISP caching server;
based on a result of resolving the received user input using the configured caching server or the trusted caching server, determine whether the received domain name causes an NXDOMAIN condition under which the received domain name does not have a corresponding IP address in a domain name system; and
in response to determining that the received domain name causes an NXDOMAIN condition,
identify a search engine associated with the web browser; and
transmit the received domain name as a search query to the search engine via the Internet using the facility provided by the ISP.

9. The computing device of claim 8, further comprising:
in response to determining that the received domain name does not cause an NXDOMAIN condition,
obtain an IP address corresponding to the received domain name; and
direct the application to a website associated with the identified IP address.

10. The computing device of claim 8 wherein:
the application contains an integrated caching server executing on the computing device as the configured caching server; and
to resolve the received domain name includes to resolve the received domain name using the integrated caching server contained in the application and without using the ISP caching server.

11. The computing device of claim 8 wherein:
the application identifies a caching server hardcoded into the application as the configured caching server; and to resolve the received domain name includes to resolve the received domain name using the identified caching server hardcoded into the application and without using the ISP caching server.

12. The computing device of claim 8 wherein:
a caching server is executing on the computing device as the web browser; and
to resolve the received domain name includes to resolve the received domain name using the caching server executing on the computing device and without using the ISP caching server.

13. The computing device of claim 8 wherein:
the user belongs to an organization; and
the trusted caching server is a private caching server available to the user and additional users of the organization.

14. The computing device of claim 8 wherein:
to resolve the received domain name includes to resolve the received domain name to generate a first DNS response; and
the memory contains additional instructions executable by the processor to cause the computing device to:
resolve the received domain name using the ISP caching server to generate a second DNS response;
perform a comparison of the first DNS response and the second DNS response;
in response to that the first DNS response does not match the second DNS response based on the comparison, indicate NXDOMAIN hijacking to the user in the application executing on the computing device; and
in response to determining that the first DNS response does match the second DNS response, indicating no NXDOMAIN hijacking to the user in the application executing on the computing device.

15. A computer readable storage medium containing instructions executable by a processor of a computing device to cause the processor to perform operations comprising:
receiving a user input to an application executing on the computing device connected to the Internet via a facility provided by an Internet service provider ("ISP");
when bypassing one or more caching servers provided by the ISP is selected,
determining whether the application contains a configurable caching server identified as a configured caching server;
in response to determining that the application contains a configurable caching server identified as the configured caching server, resolving the received user input as a DNS query in a domain name system ("DNS") without using any caching server provided by the ISP;
in response to determining that the application does not contain a configurable caching server identified as the configured caching server, locating a trusted caching server via a web search or local database lookup and resolving the received user input to the search box as a DNS query using the trusted caching server without using any caching servers provided by the ISP; and
based on a result of resolving the received user input using the configured caching server or the trusted caching server, determining whether the DNS query causes an NXDOMAIN condition under which the received user input does not have a corresponding DNS record in the domain name system; and
in response to determining that the DNS query causes an NXDOMAIN condition, displaying, via the application, an NXDOMAIN response on the computing device indicating that the received user input does not have a corresponding IP address in the domain name system.

16. The computer readable storage medium of claim 15 wherein the operations further include:
in response to determining that the DNS query does not cause an NXDOMAIN condition,
obtaining an IP address corresponding to the user input; and
directing the application to a website associated with the identified IP address.

17. The computer readable storage medium of claim 15 wherein the operations further include:
the application contains a caching server identified by the user of the computing device as the configured caching server.

18. The computer readable storage medium of claim 15 wherein:
the DNS query is a first DNS query;
resolving the received user input includes resolving the received user input to the search box as the first DNS query to generate a first DNS response without using any caching server provided by the ISP;
the operations further include:
resolving the received user input to the search box as a second DNS query using a caching server provided by the ISP to generate a second DNS response;
determining whether the first DNS response matches the second DNS response;
in response to determining that the first DNS response does not match the second DNS response, indicating NXDOMAIN hijacking to the user in the application executing on the computing device; and
in response to determining that the first DNS response does match the second DNS response, indicating no NXDOMAIN hijacking to the user in the application executing on the computing device.

19. The computer readable storage medium of claim 15 wherein the operations further include:
in response to determining that the DNS query causes an NXDOMAIN condition,
identifying a search engine associated with the search box; and
transmitting the received user input as a search query to the search engine via the Internet using the facility provided by the ISP.

* * * * *